United States Patent [19]
Evans

[11] Patent Number: 4,507,915
[45] Date of Patent: Apr. 2, 1985

[54] STALL DETECTOR AND SURGE PREVENTION FEATURE FOR A GAS TURBINE ENGINE

[75] Inventor: Rowland M. Evans, Terrasse Vaudreuil, Canada

[73] Assignee: Allied Corporation, Morris Township, Morris County, N.J.

[21] Appl. No.: 573,542

[22] Filed: Jan. 25, 1984

Related U.S. Application Data

[62] Division of Ser. No. 259,317, Apr. 30, 1981, Pat. No. 4,449,360.

[51] Int. Cl.³ .............................................. F02C 9/28
[52] U.S. Cl. ............................................. 60/39.281
[58] Field of Search .................................... 60/39.281

[56] References Cited

U.S. PATENT DOCUMENTS

| | | |
|---|---|---|
| 3,006,144 | 10/1961 | Arnett et al. . |
| 3,152,444 | 10/1964 | Peczkowski et al. . |
| 3,393,691 | 7/1968 | Longstreet et al. . |
| 3,587,229 | 6/1971 | Peczkowski . |
| 3,587,230 | 6/1971 | Schmidt .............................. 60/39.28 |
| 3,630,023 | 12/1971 | Lazar et al. ........................ 60/39.28 |
| 3,820,321 | 6/1974 | Burrage .......................... 60/39.28 R |
| 3,832,846 | 9/1974 | Leeson . |
| 3,856,884 | 5/1976 | Eves .............................. 60/39.28 R |
| 3,888,078 | 6/1975 | Greune et al. . |
| 4,018,044 | 4/1977 | Jobey et al. . |
| 4,040,250 | 8/1977 | Saunders et al. . |
| 4,045,955 | 9/1977 | Brannstrom et al. . |
| 4,100,731 | 7/1978 | Janes et al. . |
| 4,117,668 | 10/1978 | Elsaesser et al. ................... 60/39.03 |
| 4,134,257 | 1/1979 | Riple . |
| 4,134,258 | 1/1979 | Hobo et al. ........................ 60/39.14 |
| 4,171,613 | 10/1979 | Schmidt-Roedenbeck et al. . |
| 4,188,781 | 2/1980 | Johnson et al. . |

FOREIGN PATENT DOCUMENTS

| | | |
|---|---|---|
| 1267315 | 5/1968 | Fed. Rep. of Germany . |
| 2277980 | 7/1975 | France . |
| 2019618 | 10/1979 | United Kingdom . |

OTHER PUBLICATIONS

"SD Series" Controls for Aero-Engines—D. A. Caine—Nov. 1975.
Digital Control for Helicopter Powerplants—D. A. Caine & S. Janik—Nov. 1979.
NDEC—A Control Concept for Helicopter Gas Turbines—D. J. Hawes & R. M. Evans—May 1980.

*Primary Examiner*—Louis J. Casaregola
*Attorney, Agent, or Firm*—Stanley N. Protigal; William A. Marvin

[57] ABSTRACT

A proportional fuel fuel control (11) regulates the fuel flow (Wf) from a hydromechanical unit (36) based upon an error signal (E) representing the difference between a demanded speed signal (Nd) and an actual speed signal (Nh). The demanded speed signal (Nd) is generated by an integrator (32) as the time integral of the least of a plurality of acceleration terms (Aa, Ab, Ac, Ad) selected by a select low gate (38). The demanded acceleration term (Aa) is generated by junction (26) as the difference between the demanded signal (Nd) and a scheduled speed signal (Ngs). Stress acceleration terms (Ac, Ad) are generated by junctions (48, 50) and scheduling means (42, 44) which form stress limiter circuits. A stall acceleration term (Ab, is generated by a junction (46) and a scheduling means (40) which form a stall prevention feature.

12 Claims, 16 Drawing Figures

STALL DETECTOR AND SURGE PREVENTION FEATURE FOR A GAS TURBINE ENGINE

This is a division of application Ser. No. 259,317, filed Apr. 30, 1981, now U.S. Pat. No. 4,449,360.

The invention pertains generally to a stall detector and surge prevention feature for a gas turbine engine and is more particularly directed to such a feature in conjunction with an acceleration based closed loop fuel control.

The closed loop fuel control of gas turbine engines based on acceleration has been successfully implemented in various systems. These systems act directly to control the rate of change of the engine speed as a function of an acceleration term. The acceleration term is formed by differencing a scheduled term with an actual or an implied actual parameter of the gas generator. The actual acceleration of the engine is fed back through changes in the actual term for comparison with the scheduled term. Thus, the acceleration term can be envisioned as the difference between a desired or scheduled acceleration and the actual acceleration. The scheduled acceleration may be a function of any of a number of engine operating parameters including engine speed, ambient pressure, temperature compressor pressure, etc.

After the acceleration term is formed, it is integrated and the result used to effectively provide a datum for a proportional speed control loop. The speed control loop meters fuel to the engine based upon a proportional multiplication of the difference between the actual engine speed and the integrated acceleration term. Advantages of this form of acceleration control include consistent predictible accelerations which take account of fuel type, temperature, and altitude. The acceleration time of these controls is also generally independent of air bleed and power extraction status.

A closed loop fuel control for a gas turbine engine based on acceleration is more fully disclosed in a U.S. patent application Ser. No. 210,938, filed in the name of Rowland M. Evans, on Nov. 28, 1980, which is commonly assigned with the present application. The disclosure of Evans is hereby expressly incorporated by reference herein. Other examples of closed loop systems of this type are illustrated in U.S. Pat. Nos. 4,018,044; 4,100,731; and 4,040,250.

The accleration that is requested should be a function of the final desired output power or speed. Generally, it is desired that an acceleration be the safe maximum available from the engine for the particular operating conditions of the engine. Only the physical limitations of the engine should reduce the acceleration capability of the control.

One set of limiting conditions is where the compressor begins to stall and the engine enters a surge condition destructive to the equipment. Therefore, the acceleration and fuel flow must be controlled so that a safe operating margin is maintained between stall conditions and the operating point so the engine does not encounter these problems. On most controls an acceleration limiter, providing predetermined acceleration limits for the acceleration term, is utilized to control the safety factor. When on acceleration limit, the fuel flow to the engine is scheduled by the acceleration limiter without regard to the steady running line of the engine.

The acceleration limiter will include a defined acceleration schedule that under all normal operating conditions maintains a sufficient surge margin. An acceleration limiter for an acceleration based closed loop fuel control including an open loop limit schedule is more fully disclosed in a U.S. patent application Ser. No. 217,374, filed in the name of Hawes et al., on Dec. 17, 1980, which is commonly assigned with the present application. The disclosure of Hawes et al. is hereby expressly incorporated by reference herein.

There are, however, conditions which are nearly impossible to schedule for in an open loop manner. Stall may be due to unforseen accidents such as the failure of part of the control system, or a physical reduction in the stall margin due to mechanical damage, weapons exhaust or other foreign matter ingestion, intake distortions of the compressor flow field, engine exhaust recirculation, etc. If the open loop schedule were required to account for these conditions, then significant acceleration capability would be wasted during normal operation.

Therefore, in addition to a normal acceleration limiter, it would be highly desirable to include a stall detector and surge prevention feature in a fuel control for gas turbine engines. Particularly, the feature would be advantageous in the above-described acceleration based closed loop systems. Since these controls act in a closed loop manner on the error between a scheduled and an actual acceleration, the reduction in actual acceleration during a stall condition causes the system to attempt increasing the fuel flow. Morover, the control taught by Evans uses the demanded speed term as an implied actual acceleration for feedback to the control and thus only assumes the actual acceleration is following proportionally. This is, of course, the opposite of what happens in a stall condition. This contradictory action of acceleration based closed loop systems during a stall condition could exacerbate the problem causing the engine to dig further into a stall. It would be more beneficial if the closed loop control were able to detect an oncoming stall and react appropriately to prevent surge or at least reduce its severity.

One method of detecting an imminent stall is described in U.S. Pat. No. 3,867,717 issued to Moehring et al., Feb. 18, 1975. In this reference the computed compressor pressures and turbine or exit temperatures are utilized in calculating a stall factor.

Another U.S. Pat. No. 4,117,668 issued to Elsaesser et al. on Oct. 3, 1978, contemplates monitoring the acceleration schedule already in existence on a fuel control and another engine parameter, namely compressor speed, burner or compressor discharge pressure or their rate of change to detect stall. This system takes into account whether the fuel control is operating on the acceleration schedule and whether the compressor speed is decreasing. If the coincidence of these two conditions occurs then the system signals that a stall will ensue. Alternatively, the stall signal is generated if the decay rate of the burner or compressor discharge pressure is excessive and the control is operating on the acceleration schedule.

The primary limitation of these stall detectors is that they sense parameters that give an indication of stall only when the engine is in imminent danger of a total surge condition. It would be difficult with the parameters sensed in the references to determine the degree of stall an engine was experienceing in order to take anticipatory corrective action to prevent surge or at least reduce its severity.

Normally, an engine will stall during an acceleration condition, typically, but not necessarily, while on acceleration limit. If the acceleration could be reduced proportionately to the degree of stall the engine was experiencing, many, if not most surge conditions, could be prevented. A proportional reduction in demanded acceleration during a transient reduction in open loop surge margin would allow the engine to clear the compressor stall without it progressing into a surging condition. Moreover, if an engine does progress into a deep stall it is important to reduce the severity of the surge that will accompany such a condition. To accomplish these objectives it is necessary to accurately determine the degree of stall the engine is experiencing.

SUMMARY OF THE INVENTION

The invention provides an acceleration based closed loop fuel control having a stall detector and surge prevention feature based upon a stall factor Sf whose magnitude is an indication of the degree of stall an engine is experiencing.

In one preferred implementation, the stall factor Sf is generated as the magnitude of an error signal E which is output from a summing junction of an acceleration based closed loop fuel control to control the fuel/air ratio of the engine. The error signal E is formed by differencing the demanded speed and actual speed of the engine. In another preferred implementation the stall factor Sf is generated from the output of a summing junction as the difference in the rate of change of the demanded speed and the rate of change of the actual speed of the acceleration based closed loop system.

An advantage of calculating a stall factor Sf as the difference between the demanded speed and actual speed or the difference between their rates of change is that these parameters are excellent measures of the degree of stall the engine is experiencing. Normal operation of an acceleration based closed loop controller envisions that the actual speed will proportionally follow the demanded speed by the inertial lag of the engine. The magnitude of the difference of the speeds or their rates of change are therefore measures of the deviation from this norm and predictors of engine surge while additionally indicating accurately the degree to which the engine has already stalled.

Another advantage of calculating a stall factor Sf in this manner is that the demanded and actual speed parameters are easily accessible in an acceleration based closed loop system. Further, it is easy to transduce these parameters accurately into electrical signals for processing. Thus, parameters such as burner and compressor pressure that are expensive and difficult to transduce accurately over the flight envelope of a gas turbine engine are not necessary.

After generation, the stall factor Sf is input to a scheduler which calculates a correction term based upon the degree of stall. The scheduler may further schedule the correction term as a function of other engine operating parameters, for example, the actual engine speed corrected for temperature. An advantage of using corrected engine speed is that many other parameters useful for a more accurate calculation of the degree of stall are known functions of corrected speed and may be combined readily in the schedule with the stall factor Sf.

The correction term of the scheduler is used to modify the demanded acceleration term of the closed loop system proportionally to the degree of stall to reduce the probability of surge or reduce the severity of the surge should one occur in spite of the prevention measures. In one instance the correction term modifies the demanded acceleration term of the control by becoming a multiplicative factor of the output of an acceleration limiter. In another instance the correction term is representative of a stall acceleration term and is compared directly to the demanded acceleration term of the control and limit acceleration terms from a plurality of stress limiters in a select low gate. The select low gate chooses the smallest acceleration term or largest deceleration term to transmit to an integrator.

By scheduling the stall correction factor as either a multiplicative factor of the acceleration limit or as an acceleration term to be compared to the demanded acceleration term, the system provides a facile means of varying fuel flow for various degrees of stall without any discontinuities in the demanded speed. This is because it is the rate of change of the demanded speed which is varied by the stall feature and not the parameter directly. The control will thus be able to perform a smooth transition between two demanded speeds as the acceleration term is modified.

These and other objects, features, and aspects of the invention will be more clearly understood and better described if a reading of the detailed description is undertaken in conjunction with the appended drawings wherein:

DETAILED DESCRIPTION OF THE PREFERRED EMBODIMENTS

Figure 1:
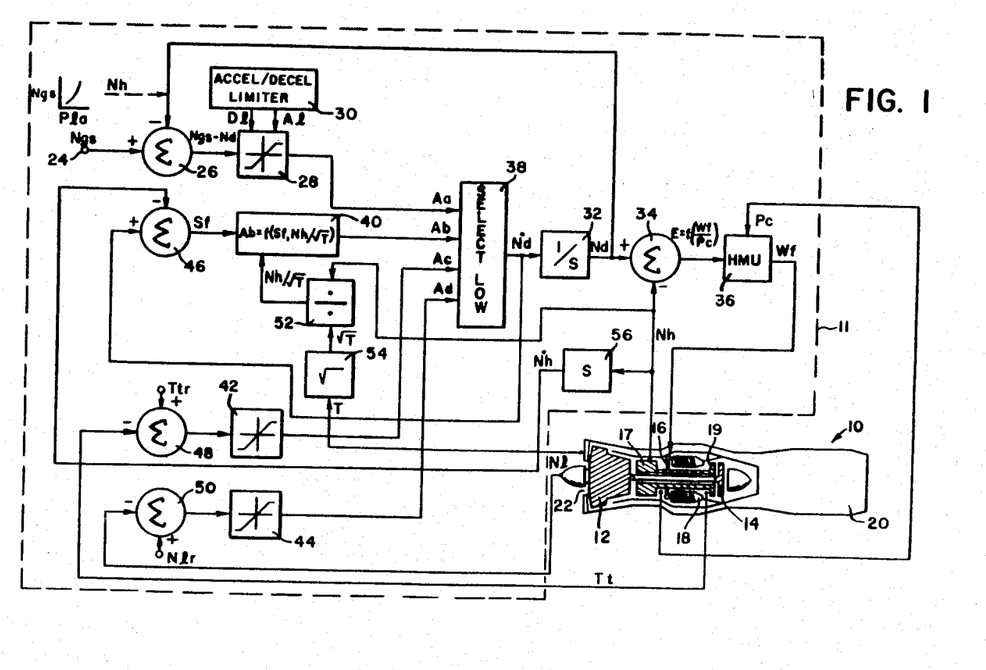
FIG. 1 is a system block diagram of a fuel control system for a gas turbine engine illustrating a first implementation of a stall detection and surge prevention feature constructed in accordance with the invention.

With reference to FIG. 1 there is shown a fuel control system 11 for a gas turbine engine which is generally designated 10. The engine 10 includes an intake duct 22 through which air enters. After entering the engine, the air is compressed by a low pressure (LP) compressor 12 and subsequently by a high pressure (HP) compressor 17. Compressors 12 and 17 are of the axial or centrifugal type which produce an increase in pressure and consequently, an increase in the density of the incoming air proportional to their rotational speed. The denser air moves to a fuel supply section where a fuel ring 16 produces a combustible fuel/air mixture by spraying fuel into the incoming air stream. The fuel/air mixture is thereafter ignited and combusted in burners 18 to produce a high velocity exhaust gas.

The exhaust gas, as is conventional in this type of reaction engine exits through a nozzle 20 to produce a forward thrust. A portion of the energy contained in the exhaust gases is expended in rotating a low pressure turbine 14 and a high pressure turbine 19 which are physically attached to the respective compressors by concentrically disposed rotor shafts. Each compressor and turbine combination form a spool which rotates independently from the other. Additionally, the LP compressor may divert a portion of the incoming air into a shroud which bypasses the engine and combines with the exhausted gases upstream of the nozzle. The engine described is a conventional two-spool turbofan engine in which the second or low pressure spool has been added to increase the efficiency of the engine.

Generally, the control of the engine speed, and thus the output power or thrust of the engine, is regulated by the amount of fuel flowing into the fuel ring 16. This fuel flow Wf is modulated by the fuel control 11 to provide more or less energy to the exhaust gas and thus reaction power from the engine. Generally, increasing the fuel flow increases the engine speed and output power while decreasing the fuel flow decreases the engine speed and output power.

The fuel control system 11 is provided for assuring that the control of the engine speed is maintained during steady state operation, accelerations, and decelerations. The fuel control illustrated is based on an input to terminal 24 which is the desired or scheduled rotational speed Ngs of one of the compressor and turbine spool combinations of the engine 10. Single Ngs can, for example, be generated as the output from a schedule based on the power lever angle (PLA) of the particular device the engine is used on. In its simplest form, the Ngs signal can be generated from a potentiometer that is ganged to the power lever. A typical schedule of Ngs vs PLA is illustrated to the immediate left of terminal 24.

When referring to the engine speed either the high pressure compressor speed (HP spool speed Nh) or the low pressure compressor speed (LP spool speed Nl) is meant because either can be used to control the engine. In this particular system, the controlling parameter of the fuel control will be the HP spool speed Nh. The HP spool speed is chosen as the controlling parameter in this type of engine since it is the more critical to the operation.

By scheduling the commanded speed Ngs to terminal 24 any desired engine power may be obtained since the fuel control varies the power of the gas turbine engine by regulating the engine speed. Thus, the control system operates to govern the engine speed as a function of the scheduled speed Ngs and accelerates or decelerates the engine in a controlled manner to reach a new scheduled speed when the pilot or other system component changes the scheduled engine speed. Otherwise, for changes in engine environment such as altitude, temperature, pressure, or other factors the governor acts to maintain the scheduled speed Ngs.

To control accelerations or decelerations, the fuel control 11 forms a demanded acceleration term Aa which is preferably the difference between the scheduled speed Ngs and a demanded speed term Nd. Alternatively, the demanded acceleration term Aa can be formed as the difference between the HP spool speed signal, Nh, and the scheduled speed signal Ngs. However, the advantages of forming the demanded acceleration term as a function of the demanded speed signal are set forth in the referenced Evans application. The differencing function is performed by feeding the two chosen parameters to a first summing junction 26 and generating a difference signal of sign and magnitude equivalent to the difference therebetween. The demanded acceleration term or difference signal Aa is usually integrated in an integrator 32 after passing through a select low gate 38 to become the demanded speed signal Nd. This portion of the control forms an integral loop providing a datum which is the demanded speed signal Nd.

Before the demanded acceleration term Aa is passed through the select low gate 38 it is conventionally limited by a comparator circuit 28. The comparator 28 compares the demanded acceleration term Aa to an upper limit AL and a lower limit DL and passes the term unmodified if it is between these two values. However, if the demanded acceleration term is great enough to cause surge the acceleration term will be as limited at the upper acceleration limit AL while if the deceleration is sufficient to cause flameout it will be limited at the lower deceleration limit DL. These demanded acceleration limits can either be fixed or variable.

An accel/decel limiter circuit 30 is used to generate the limits Al, Dl and to modify the limits as a function of a group of operating parameters of the engine if they are to be variable. If this is the case an open loop acceleration limit schedule is stored in a memory device of the circuit 30 where the schedule is substantially equivalent to the steady-state surge line of a particular engine expressed as a function of the engine operating parameters chosen. An accel/decel limiter circuit of this type is more fully disclosed in the referenced copending U.S. patent application Ser. No. 217,374, where the acceleration limit AL is defined in terms of $Nh \times (d(Nh)/dt)/Wf$.

Thereafter, the demanded speed signal Nd is differenced with the HP spool speed, Nh, in a second summing circuit 34. An error signal E generated by this difference is then used to proportionally control the fuel flow to the engine 10 in a direction tending to null the error. In this manner, this portion of the controller forms a proportional control loop slaved to the datum Nd. For changes in the datum Nd the actual speed signal Nh will follow and change to where there is a steady state error E (indicative of a constant fuel flow) supporting the particular demanded speed Nd.

The proportional control is developed by a hydromechanical unit (HMU) 36 which receives as an input the error signal E. The HMU 36 multiplies the error signal E by a predetermined gain to provide a fuel flow Wf which is proportional to the error. In its simplest form, if the error signal E is electrical, the HMU could be implemented as a proportional solenoid valve which changes position with respect to a control voltage representative of the error signal E to regulate fuel flow from a pressurized fuel source. The HMU 36 would therefore, also consist of a pressure regulator and a pressurized source of fuel (not shown) as is conventionally known in the art.

Additionally, the HMU 36 can include means for mechanically multiplying the error signal E by an input signal representative of the output of the compressor stages, compressor pressure Pc. In combination with the proportional solenoid the multiplying means could comprise a multiplying piston coupled to the fuel valve which transduces the compressor pressure Pc into a force to assist the solenoid. Thus, the error signal E at all engine operating points is proportional to the Wf/Pc or the fuel/air ratio of the engine. Because of the mechanical multiplication signal, the error signal E can be thought of as being generated as a function of the fuel/air ratio of the engine. Normally, this makes the scheduling of the speed signal Ngs much easier to implement.

Another input to the select low gate 38 of the fuel control 11 is a stall acceleration term Ab output from a scheduler 40. The scheduler 40 receives inputs from a summing junction 46 and a divider 52 and schedules the acceleration term Ab as a function of these inputs. The parameter generated by the summing junction 46 is a stall factor Sf calculated as the difference between the rate of change of the demanded speed Nd and the rate of change of the actual speed Nh. The rate of change of the demanded speed d(Nd)/dt is developed as the output of the select low gate 38 prior to integration by integrator 32 while the rate of change of the actual speed d(Nh)/dt is developed as the output of a differentiator 56 having Nh as an input. The output of the divider 52 is the actual speed corrected for temperature $Nh/\sqrt{T}$. The divider genrates this parameter by dividing one of its inputs Nh by the other input $\sqrt{T}$ output from square root function generator 54. The signal T representative of the actual ambient temperature the engine is experiencing is input to the generator 54.

Additionally included in the fuel control system 11 is a temperature limit circuit comprising a summing junction 48 and a scheduling means 42. The temperature limiter circuit obtains from the engine 10 a turbine inlet temperature signal Tt which is representative of the temperature of the high velocity exhaust gases approaching the turbine blades. The signal Tt can be generated by a conventional temperature sensor located in proximity to the turbine inlet as shown. The temperature signal Tt is then transmitted to the summing junction 48 where it is differenced with a turbine temperature reference Ttr. The reference Ttr is indicative of the physical temperature limit that the exhaust gas must not exceed if turbine damage is to be avoided. The difference signal generated from the summing means 48 is therefore, an indication of how close the engine is operating to its turbine temperature limit. This difference signal is transmitted to the scheduling means 42 and a limit acceleration or deceleration term Ac is generated depending upon the magnitude and sign of the difference.

Similarly, an overspeed limiter circuit comprises a summing means 50 and a scheduling means 44. A speed signal Nl is obtained from the engine which is representative of the actual speed of the LP spool and is transmitted to the summing means 50. This actual speed Nl is differenced with an overspeed limit reference Nlr and a difference signal generated. The difference signal is indicative of the distance the engine is operating from the LP spool overspeed limit. The difference is transmitted to the scheduling means 50 and another limit acceleration or deceleration term Ad is generated based upon the magnitude and sign of the difference signal.

The outputs of the stress limiter circuits Ac, Ad, and the outputs of the stall circuit Ab are combined with the demanded acceleration term Aa from comparator circuit 28 in the select low gate 38. This gate selects the lowest acceleration term of the group and transmits it to the integrator 32 blocking all other acceleration terms. In this manner, the smallest acceleration or largest deceleration term of the four terms is demanded from the system.

Normally, the acceleration term that is integrated to form the datum or demanded speed Nd, is term Aa, produced by the flow path from the Ngs signal and the Nd signal through differencing circuit 26 and comparator 28. However, when either the overspeed limit or turbine temperature limit is approached the acceleration terms Ac, Ad produced by the limiter circuits may become less than the scheduled acceleration. At that point the select low gate 38 will use the lowest acceleration of these three to transmit to the integrator 32. If, for some reason, either of the limits are exceeded, then decelerations are scheduled directly for the system by the stress limiter circuits through the select low gate 38. Preferably, the stress limiter circuits are those illustrated in copending U.S. application Ser. No. 257,027 filed in my name on Apr. 24, 1981, now abandoned and continued as Ser. No. 550,702, filed on Nov. 14, 1983, which is commonly assigned with the present application. The disclosure of that application is hereby incorporated by reference herein.

Under a stall condition, however, it is the stall acceleration term Ab which may become less than the demanded acceleration term Aa. The term Ab is scheduled as a function of the stall factor Sf which indicates the degree of stall the engine is experiencing. When the Ab becomes less than Aa the engine experiences a reduction in the demanded acceleration through the select low gate 38 such that the engine may clear a stall condition before it progresses into a total surge. The reduction in demanded acceleration will be proportional to the degree of the stall as will be more fully explained hereinafter.

Figure 2:
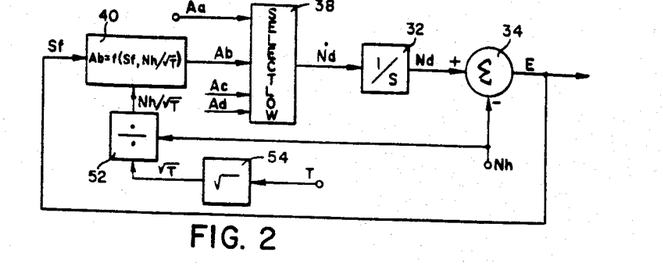
FIG. 2 is a partial system block diagram illustrating a second implementation of the stall feature for the fuel control system disclosed in FIG. 1.

FIG. 2 is a partial schematic block diagram of a second implementation of a stall detector and surge prevention feature similar to FIG. 1. Identical elements have been labeled with the same reference numerals for the sake of clarity and the placement in the larger system of the partial block diagram is obvious. The difference between this implementation and that shown in FIG. 1 is that the stall factor Sf that is input to scheduler 40 is the error signal E. The error signal E is generated as the output of the summing junction 34 as the difference between the demanded speed signal Nd and the actual speed signal Nh. Since the stall factor Sf generated in this manner also has a magnitude indicative of the degree of stall, the same schedule for the scheduler 40 shown in FIG. 1 can be used by appropriate scaling.

Figure 3:
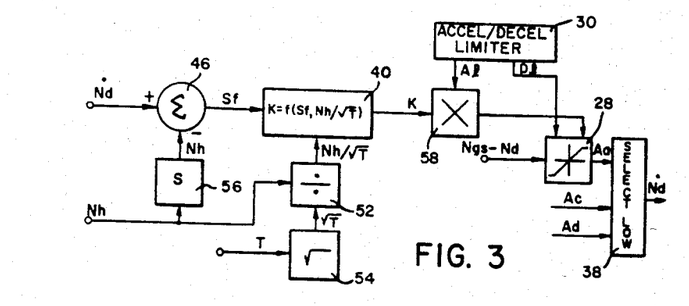
FIG. 3 is a partial system block diagram illustrating a third implementation of the stall feature for the fuel control system disclosed in FIG. 1.

FIG. 3 is a partial schematic block diagram of a third implementation of a stall detector and surge prevention feature similar to FIG. 1. Identical elements have been labeled with the same reference numerals for the sake of clarity and the placement in the larger system of the partial block diagram is obvious. The difference between this implementation and that shown in FIG. 1 is the output of the scheduler 40 is not an acceleration term Ab but a multiplicative factor K. The multiplicative factor K is input to a multiplier 58 in order to modify the acceleration limit AL prior to its receipt by comparator 28. The multiplicative factor K is generated by the scheduler 40 as a function of the stall factor Sf and the actual speed corrected for temperature $Nh/\sqrt{T}$. The modification will reduce the demanded acceleration proportionately to the degree of the stall as will be more fully explained hereinafter.

Figure 4:
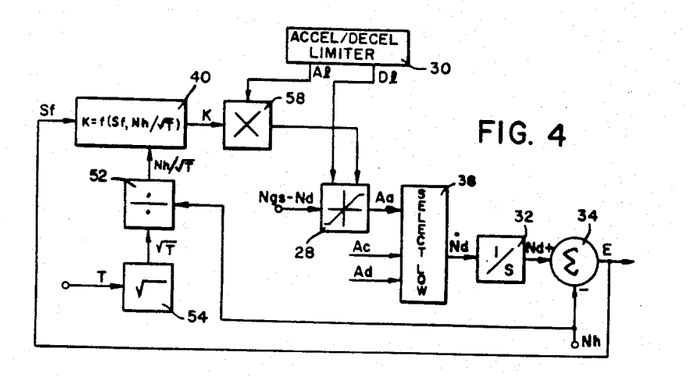
FIG. 4 is a partial system block diagram illustrating a fourth implementation of the stall feature for the fuel control system disclosed in FIG. 1.

FIG. 4 is a partial schematic block diagram of a fourth implementation of a stall detector and surge prevention feature similar to that shown in FIG. 3. Identical elements have been labeled with the same reference numerals for the sake of clarity and the placement in the larger system of the partial block diagram is obvious. The difference between this implementation and that illustrated in FIG. 3 is the stall factor Sf input to the scheduler 40 is the error signal E. As was the case for the second implementation, this method of generating the stall factor Sf produces a parameter indicative of the degree of stall the engine is experiencing. No modification of the schedule of the scheduler 40 shown in FIG. 3 is necessary except for the correct scaling.

Therefore, the stall factor Sf, calculated from either the difference between the demanded speed and the actual speed or the difference between their rates of change, can be utilized to generate an acceleration term or a multiplicative factor to prevent a surge or reduce its degree of severity by making appropriate modification of the acceleration rate of the engine and hence fuel flow based on the degree of stall.

Figure 11:
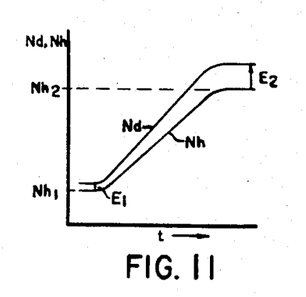
FIGS. 11 through 16 are graphical representations of the relationship of the demanded speed Nd and actual speed Nh as a function of time for various operating conditions of the fuel control systems disclosed in FIGS. 1–4.

To more fully explain the operation of the fuel control system under the influence of the stall detector and surge prevention feature reference is given to FIGS. 11-16. These Figures describe the relationship of Nd and Nh as a function of time t for various operating conditions of the engine. FIG. 11 illustrates the relationship with respect to time between the demanded speed Nd and the actual speed Nh for a normal acceleration of the engine by the fuel control system 11. The acceleration shown will be from an initial steady state speed of Nh1 to a final steady state speed of Nh2 and thus cause the error signal E to increase from E1 to E2 in order to support the larger steady state fuel flow. It is seen that the acceleration is accomplished by having the actual speed parameter Nh proportionally follow the demanded speed parameter Nd by the time lag introduced by the engine responding to changes in the fuel flow. It is assumed that during this acceleration the engine will be on the acceleration limit AL and thus Nd will increase at a constant slope if no changes of the limit occur during this time. This is the generalized behavior of the engine during conventional accelerations for the proportional controller shown and if the relationship is maintained it is apparent that the engine will not experience stall.

However, if the relationship between the demanded speed Nd and the actual Nh does not follow the graphical representation illustrated in FIG. 11, then deviations from the ideal relationship can be used to measure the degree of stall the engine is experiencing so that an appropriate remedy may be provided. The remedy is provided according to the severity or degree of stall the engine is experiencing at any moment.

Figure 12:
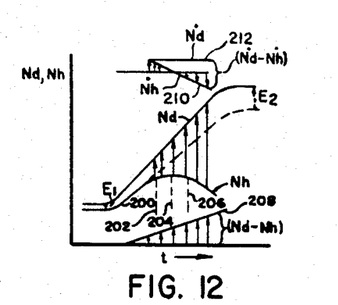

FIG. 12 illustrates the relationship between the demanded speed Nd and the actual speed Nh during a total engine stall. The illustration shows the progress of the stall through four separate regions representing the different degrees of the failure of the engine to keep pace with the demanded speed Nd. In the first region, from dotted line 200 to dotted line 202, the actual speed Nh basically follows normal defined relationship and the engine is substantially on the acceleration schedule. Some deviation will be allowed for normal transient behavior.

However, as the stall progresses into a second region, defined by dotted lines 202-204, the engine begins accelerating at a slower pace than the demanded term Nd is commanding. In this region the engine is defintely off the acceleration schedule and is beginning to stall. If the stall worsens, there is imminent danger at this time of initiating a mild surge. The third region, defined by lines 204-206, illustrates where a mild surge has developed and the engine has stopped accelerating and even possibly started a small deceleration. As the engine moves deeper into a total stall the engine begins to decelerate more rapidly. This activity is illustrated by the region beyond dotted line 206. If this increased deceleration in the face of increasing demanded speed is continued for any substantial length of time a damaging surge within the engine can occur.

The regions illustrated are generalized operating characteristics of a gas turbine engine under control of an acceleration based closed loop fuel control system. Specific engines may have somewhat different operating curves than that shown but all will exhibit the typical divergence of the demanded speed and actual speed during stall shown. The four regions mapped out for the application were chosen because of the conventional engine response during these particular degrees of stall, i.e., on schedule, definitely off schedule, possible mild surge, and possible total surge. It is apparent that other similar regions may be defined to indicate the degree of stall and, for a particular engine, the boundaries of these regions must be empirically established.

Line 208 illustrates, on the same time base, how the difference between the parameters Nd and Nh increases for the stall condition illustrated in FIG. 12. It is seen, therefore, that the magnitude of the difference (Nd−Nh) is an indication of the degree of stall that the engine is experiencing. Further, it is noted that the regions defined by the lines 200, 202, 204, 206 can be empirically related to the magnitude of the stall factor Sf for any particular engine. By this technique one can control the engine in any of these regions by knowning the magnitude of the stall parameter Sf.

In similar manner the differences in the rates of change of the paramenters Nd and Nh can be used to calculate the stall factor Sf. Line 210 in FIG. 12 illustrates the varying acceleration of the actual speed parameter Nh during a stall condition. In the first and second regions (200-204) the parameter is positive but becoming increasingly smaller as the acceleration falls to zero. In the third and fourth regions the growing deceleration of the engine, as it digs deeper into the stall, is illustrated as an increasing negative magnitude. During this time the rate of change of the demanded speed parameter Nd remains substantially constant, if the acceleration limit is not changed as is illustrated by line 212. Therefore, the magnitude of the difference $d(Nd)/dt - d(Nh)/dt$ can additionally be used as an indication of the degree of stall. It is seen in the initial stages that the difference is small and grows larger as the stall deepens. By relating the magnitude of the difference in the rates of change of the two speed parameters to the regions defined by lines 200, 202, 204, 206 the engine can be controlled to prevent a surge or to reduce its severity if one occurs.

Figure 7:
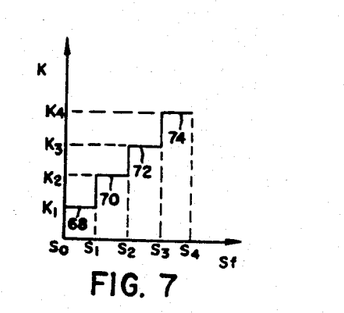
FIG. 7 is a graphical representation of the correction term (k) for the fuel control systems disclosed in FIGS. 3, 4, as a function of a stall factor Sf.
Figure 10:
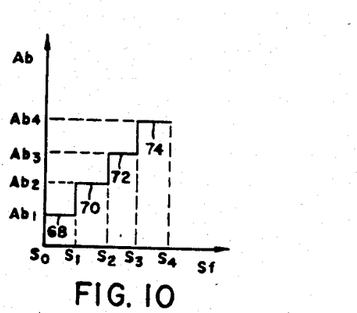
FIG. 10 is a graphical representation of a correction term Ab for the fuel control systems disclosed in FIGS. 1 and 2 as a function of the stall factor Sf.

The preferred relationship of the stall factor Sf to the acceleration term Ab or the multiplicative constant K is shown in FIGS. 7 and 10. Scheduler 40 for embodiments 1, 2 stores the scheduler in FIG. 10 and scheduler 40 for FIGS. 3, 4, stores the scheduler in FIG. 7. Region 200-202 of the engine corresponds to the magnitude of the stall factor from S0-S1, region 202-204 corresponds to the magnitude of the stall factor from S1-S2, region 204-206 corresponds to the magnitude of the stall factor from S2-S3, and the region beyond line 206 corresponds to the magnitude of the stall factor from S3-S4.

Thus, in FIG. 7 different values of the multiplicative constant K can be scheduled for the magnitude of the stall factor Sf and related to the degree of stall of the engine. The magnitude K1 represented by line 68 is scheduled for the region S0-S1, magnitude K2 represented by line 70 scheduled for the region S1-S2, magnitude K3 represented by line 72 scheduled for the region S2-S3, and magnitude K4 represented by line 74 scheduled for region S3-S4. Similarly, in FIG. 10 a corrective schedule of the same shape is described for the acceleration term Ab. The values Ab1, Ab2, Ab3, Ab4 correspond to regions Sf0-Sf1, Sf1-Sf2, Sf2-Sf3, and Sf3-Sf4, respectively. While the preferred stair step schedule has been shown, it is readily within the skill of the art to provide a much more complex scehdule.

Figure 13:
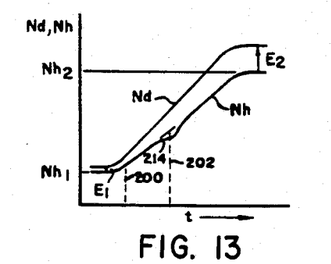

To illustrate the control of the engine according to the degree of stall, reference is now given to FIG. 13 where a relationship between the demanded speed Nd and actual speed Nh is illustrated. It is understood that if the magnitude of the stall factor Sf does not exceed the region S0-S1 corresponding to regions 200-202, then the the engine will stay substantially on the acceleration schedule even though there may be a momentary hesitation 214 during its acceleration from Nh1 to Nh2. The degree of stall is small enough to allow the engine to clear itself without acceleration modification. Therefore, the schedule in FIG. 7 will produce a multiplicative factor K1 of unity or one that when multiplied by the acceleration limit AL will not modify the demanded acceleration of the engine.

Figure 14:
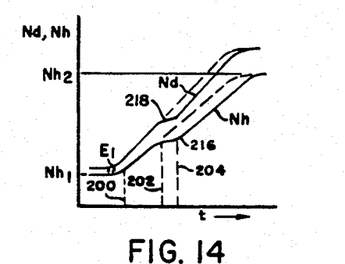

In FIG. 14 it is shown that the degree of stall may increase to generate a stall factor Sf of a magnitude in the region S1-S2 corresponding to region 202-204. In this case the demanded acceleration should be lowered so that when the engine clears the stall at position 216 it can continue accelerating thereafter. Thus, the scheduler 40 finding the stall factor magnitude between S1-S2, schedules the multiplicative constant K2 at some fraction between 1 and 0. In the preferred form the multiplicative constant K2 is scheduled at one-half the acceleration limit AL. This action will lower the demanded acceleration at 218 when Sf increases beyond S1 and will cause the controller to retain the lower acceleration value until the magnitude of the factor becomes less than S1.

Figure 15:
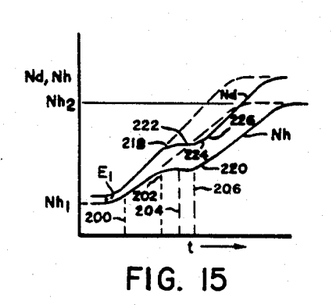

As shown in FIG. 15, if the stall has progressed to the region 204-206, the control will have stepped through the multiplicative constant K1, K2 to the multiplicative constant K3 as the stall factor increases it magnitude to exceed S2. In such a mild surge condition the engine should be brought to a zero acceleration rate at 222 until the stall has cleared itself at 220 and the engine can begin accelerating again. Thus, the value of K3 is scheduled as a zero multiplicative constant to terminate accelerations from the control. As the engine begins to actually accelerate once more, the demanded term Nd can be increased to one-half the acceleration limit by the constant K2 at 224 and thereafter to the full acceleration limit by the constant K1 at 226.

Figure 16:
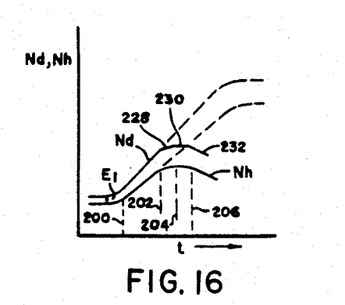

Referring to FIG. 16, for deep stalls, however, if the stall factor reaches a magnitude greater than S3 this indicates that the region beyond line 206 has been breeched and the lowering of the demanded acceleration rate at 228, 230 by K2, and K3 has not cleared the stall. The value K4 will therefore be generated and a demanded deceleration at 232 initiated. Generally, K4 is a negative constant set at the deceleration limit DL but could be any deceleration desired. The deceleration limit DL will thereafter be demanded until the relationship between the demanded speed and the actual speed attains a value less than S3. If the engine is operating in the region it is in imminent danger of total surge. A deceleration at this time will possibly prevent this from occuring or at least reduce its severity.

It is seen that the acceleration rates for the engine move up and down the stair step schedule of FIG. 7 according to the degree of stall that the engine is experiencing at the particular moment.

For FIG. 10 the action produced by the acceleration term Ab is similar in intent to that described for the multiplicative factor K. Therefore, when the stall factor magnitude is in the region S0-S1, the term Ab1 will be scheduled at an acceleration greater than the largest acceleration limit AL. This value will cause no modification of the demanded speed and the engine will remain on the open loop acceleration schedule.

If the magnitude of the stall factor Sf reaches the region S1-S2, then acceleration should be limited and thus the term Ab2 is generated. The acceleration term Ab2 will be equivalent to a predetermined acceleration rate which is between zero and the minimum value of the acceleration limit AL, for example, one-half the minimum rate. At the time the magnitude of the stall factor Sf reaches a value in the region between S2-S3 then acceleration term Ab3 is generated. This will provide a demanded acceleration that is zero for the purposes of clearing the stall. Finally, if the magnitude of the stall factor Sf reaches the region S3-S4, then the acceleration term Ab4 will be scheduled equivalent to the deceleration limit DL.

It has been shown how the multiplicative factor K and the acceleration term Ab may be scheduled as a function of a stall factor Sf which is related to the degree of stall to control the engine. It will now be disclosed that the terms can be scheduled as a function of various other engine operating parameters. Particularly, one parameter that is advantageous for this mode is the actual speed corrected for temperature, $Nh/\sqrt{T}$. This is true because other useful combinations of parameters are known functions of the corrected speed $Nh/\sqrt{T}$ and therefore can be combined directly with the schedules in FIGS. 7 and 10 to form three-dimensional mapping routines for the terms.

Figures 5, 6, 8, 9:
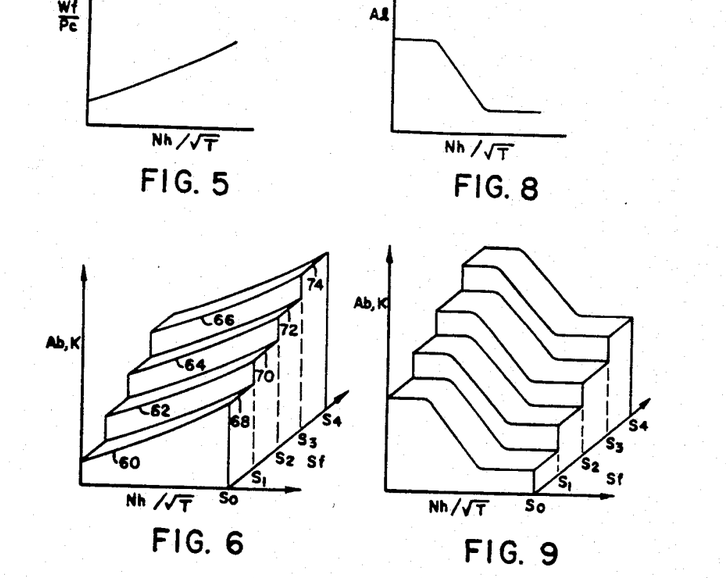
FIG. 5 is a graphical representation of the fuel/air ratio Wf/Pc of the engine shown in FIG. 1 as a function of the corrected engine speed $Nh/\sqrt{T}$.
FIG. 6 is a graphical representation of the correction terms (Ab, K) for the fuel control systems disclosed in FIGS. 1–4 as a function of a stall factor, Sf, and the corrected engine speed $Nh/\sqrt{T}$.
FIG. 8 is a graphical representation of the acceleration limit AL for the engine shown in FIG. 1 as a function of the corrected engine speed $Nh/\sqrt{T}$.
FIG. 9 is a graphical representation of a correction terms (Ab, K) for the fuel control systems disclosed in FIGS. 1–4 as a function of a stall factor, Sf, and the corrected engine speed $Nh/\sqrt{T}$.

In FIG. 5 one such graphical representation is shown where the fuel/air ratio Wf/Pc is shown as a function of corrected speed $Nh/\sqrt{T}$. FIG. 6 shows the combination of either FIG. 7 or FIG. 10 and FIG. 5 where the third axis is the corrected speed $Nh/\sqrt{T}$. This type of schedule will be particularly advantageous for the embodiments shown in FIGS. 2 and 4. This is because that the error E varies with the corrected speed according to changes in the fuel/air ratio, Wf/Pc. A more accurate measure of the degree of stall can be accomplished in this manner for the embodiments of FIGS. 2 and 4.

Simiarly, FIG. 8 shows the acceleration limit AL as a function of the corrected speed $Nh/\sqrt{T}$. FIG. 9 shows the combination of FIG. 8 and either FIG. 7 or FIG. 10 where the corrected speed $Nh/\sqrt{T}$ is shown as the third axis. This schedule will be particularly advantageous for the embodiments of the invention shown in FIGS. 1 and 3. This is because the demanded acceleration d (Nd)dt varies with the corrected speed according to the changes in the acceleration limit AL. A more accurate measure of the degree of stall can be accomplished in this manner for the embodiments of FIGS. 1 and 3.

While a detailed description of the preferred embodiments and implementations of the invention has been disclosed, it will be obvious to those skilled in the art that various modifications and changes may be made thereto without departing from the spirit and scope of the invention as is hereinafter defined in the appended claims.

What is claimed is:

1. A fuel control system for a gas turbine engine comprising:
   means for generating an actual speed signal proportional to the actual turbine speed of the gas turbine engine;
   means for generating a scheduled speed signal proportional to a desired output power;
   means for generating a demanded speed signal proportional to the time integral of a difference signal;
   means for generating said difference signal proportional to the difference between said scheduled speed signal and said demanded speed signal;
   means for generating an error signal proportional to the difference between said demanded speed signal and said actual speed signal;
   means for controlling the fuel flow to the gas turbine engine as a function of said error signal;
   means responsive to the actual speed signal and the demanded speed signal for generating a stall factor as a function of the difference between actual speed signal and the demanded speed signal and indicative of the degree of stall the engine is experiencing; and
   means, responsive to the stall factor, to further control fuel flow to the gas turbine engine.

2. The fuel control system as defined in claim 1 wherein:
   said stall factor is generated as a function of the difference between the demanded speed signal and the actual speed signal.

3. A fuel control system as defined in claim 2 which further includes:
   means for modifying the rate of change of the demanded speed signal as a function of the stall factor.

4. A fuel control system as defined in claim 3 wherein said means for modifying the rate of change of the demanded speed signal includes:
   means for generating a multiplicative factor as a function of the stall factor; and
   means for multiplying said multiplicative factor by an acceleration limit to modify the said limit before it is input to the comparator to limit the rate of change of said demanded speed.

5. A fuel control system as defined in claim 4 wherein:
   said multiplicative factor is a function of the degree of stall the engine is experiencing such that no modification of the acceleration limit is scheduled if the stall factor indicates that the engine is substantially on an acceleration schedule.

6. A fuel control system as defined in claim 5 wherein:
   said multiplicative factor is a function of the degree of stall the engine is experiencing such that a fractional modification is scheduled if the stall factor indicates the engine is off the acceleration schedule.

7. A fuel control system as defined in claim 6, wrerein:
   said multiplicative factor is a function of the degree of stall the engine is experiencing such that a zero acceleration is scheduled if the stall factor indicates the engine is in danger of experiencing a mild surge condition.

8. A fuel control system as defined in claim 7, wherein:
   said multiplicative factor is a function of the degree of stall the engine is experiencing such that a deceleration is scheduled if the stall factor indicates the engine is in danger of experiencing a total surge condition.

9. A fuel control system as defined in claim 3, wherein:
   said means for modifying the rate of change of the demanded speed signal includes modifying said signal as a function of at least one other engine operating parameter.

10. A fuel control system as defined in claim 9, wherein:
    said other engine operating paramenter is actual engine speed corrected for temperature.

11. A fuel control system as defined in claim 10, wherein:
    said modification is proportional to the change in fuel/air ratio as a function of corrected engine speed.

12. A fuel control system as defined in claim 11, wherein:
    said modification is proportional to the change in the acceleration limit as a function of corrected engine speed.

* * * * *